United States Patent
Liao et al.

(10) Patent No.: US 11,335,221 B2
(45) Date of Patent: May 17, 2022

(54) METHOD, DEVICE AND SYSTEM FOR DETECTING DISPLAY PANEL

(71) Applicants: BOE TECHNOLOGY GROUP CO., LTD., Beijing (CN); CHENGDU BOE OPTOELECTRONICS TECHNOLOGY CO., LTD., Sichuan (CN)

(72) Inventors: Wenjun Liao, Beijing (CN); Da Zhou, Beijing (CN); Zailong Mo, Beijing (CN); Yiyang Zhang, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu (CN)

( * ) Notice: Subject to any disclaimer, the term of this patent is extended or adjusted under 35 U.S.C. 154(b) by 644 days.

(21) Appl. No.: 16/305,639

(22) PCT Filed: Feb. 1, 2018

(86) PCT No.: PCT/CN2018/074985
§ 371 (c)(1),
(2) Date: Nov. 29, 2018

(87) PCT Pub. No.: WO2019/019599
PCT Pub. Date: Jan. 31, 2019

(65) Prior Publication Data
US 2021/0225218 A1    Jul. 22, 2021

(30) Foreign Application Priority Data

Jul. 26, 2017   (CN) .......................... 201710619827.4

(51) Int. Cl.
*G09G 3/00* (2006.01)
*G09G 3/20* (2006.01)

(52) U.S. Cl.
CPC ............... *G09G 3/006* (2013.01); *G09G 3/20* (2013.01); *G09G 2320/103* (2013.01)

(58) Field of Classification Search
CPC ..... G09G 3/006; G09G 3/20; G09G 2320/103
See application file for complete search history.

(56) References Cited

U.S. PATENT DOCUMENTS 6,081,073 A    6/2000   Salam
7,199,602 B2   4/2007   Nara et al.
(Continued)

FOREIGN PATENT DOCUMENTS

CN    101477783 A     7/2009
CN    102081244   *   6/2011
(Continued)

OTHER PUBLICATIONS

Zhang Yu; "Research on Mura Inspection Technology of TFT-LCD Based on Machine Vision", Dissertation for the Doctoral Degree in Engineering; 133 pages. Jun. 2006.
(Continued)

*Primary Examiner* — Mark W Regn

(57) ABSTRACT

A method, device and system for detecting a display panel are disclosed. The display panel includes a plurality of groups of pixels, and the method includes: controlling the plurality of groups of pixels to be successively displayed with a first gray scale, and in condition that an ith group of pixels are displayed with the first gray scale, controlling other groups of pixels in the plurality of groups of pixels except the ith group of pixels to be displayed with a second gray scale, the ith group of pixels being any group of pixels in the plurality of groups of pixels; detecting a first current output by the display panel, in a process of displaying the ith group of pixels with the first gray scale; determining that a display abnormality occurs to the ith group of pixels, in
(Continued)

condition that the first current is not within a first current range.

10 Claims, 11 Drawing Sheets

(56) References Cited

U.S. PATENT DOCUMENTS

| | | |
|---|---|---|
| 7,796,169 B2 | 9/2010 | Kitani |
| 2004/0150590 A1 | 8/2004 | Cok et al. |
| 2004/0174320 A1* | 9/2004 | Matthijs .................. G09G 3/20 345/30 |
| 2005/0168434 A1 | 8/2005 | Wang-Yang |
| 2008/0055210 A1 | 3/2008 | Cok |
| 2009/0174628 A1 | 7/2009 | Wang et al. |
| 2012/0310575 A1 | 12/2012 | Cheng |
| 2015/0348458 A1 | 12/2015 | Tian et al. |
| 2016/0104407 A1 | 4/2016 | Hong et al. |
| 2017/0004773 A1 | 1/2017 | Kim et al. |
| 2017/0053577 A1 | 2/2017 | Cao et al. |
| 2018/0330649 A1 | 11/2018 | Zhu |

FOREIGN PATENT DOCUMENTS

| | | |
|---|---|---|
| CN | 102081244 A | 6/2011 |
| CN | 102221753 A | 10/2011 |
| CN | 104954797 A | 9/2015 |
| CN | 105096786 A | 11/2015 |
| CN | 105845062 A | 8/2016 |
| CN | 106328027 A | 1/2017 |
| CN | 106816137 A | 6/2017 |
| CN | 106920496 A | 7/2017 |
| CN | 107068063 A | 8/2017 |
| JP | 2005115338 A | 4/2005 |
| JP | 2005141094 A | 6/2005 |
| JP | 2005-215673 A | 8/2005 |
| JP | 2008021441 A | 1/2008 |
| JP | 2009098579 A | 5/2009 |
| KR | 1020060073688 A | 6/2006 |

OTHER PUBLICATIONS

The First Chinese Office Action dated Jul. 2, 2019; Appln. No. 201710619827.4.
International Search Report and Written Opinion dated May 3, 2018; PCT/CN2018/074985.
The Extended European Search report dated Apr. 6, 2021; Appln. No. 18800026.9.
The First Japanese Office Action dated Oct. 11, 2021; Appln. No. 2018-562194.

* cited by examiner

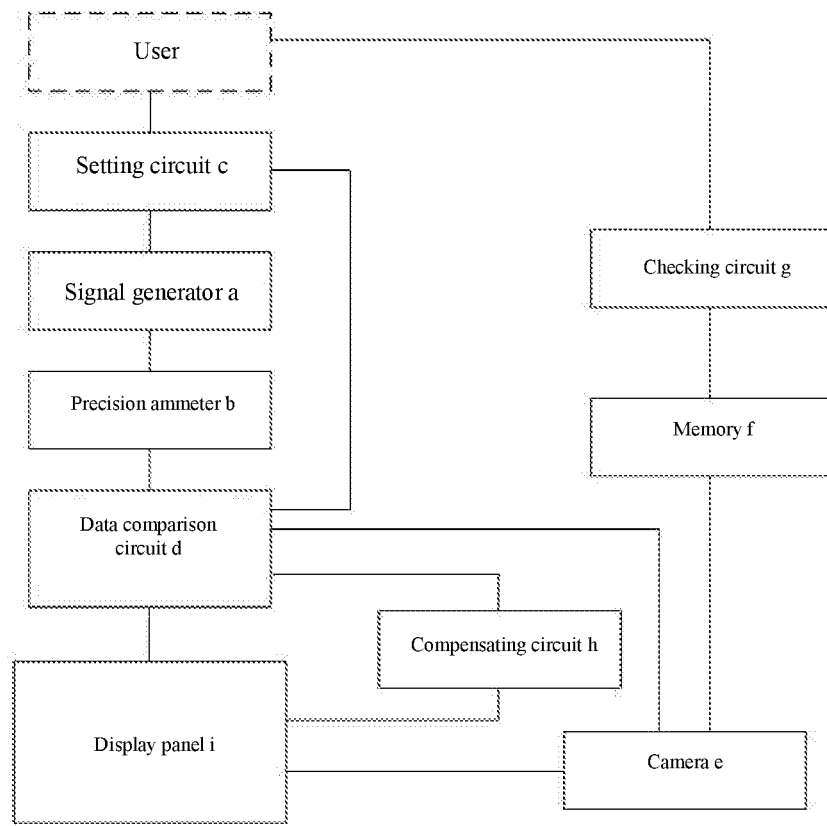

FIG. 1-1

101 Controlling a plurality of groups of pixels to be successively displayed with a first gray scale, and in condition that an $ith$ group of pixels are displayed with the first gray scale, controlling other groups of pixels in the plurality of groups of pixels except the $ith$ group of pixels to be displayed with a second gray scale 102 Detecting a first current output by the display panel, in a process of displaying the $ith$ group of pixels with the first gray scale 103 Determining that a display abnormality occurs to the $ith$ group of pixels, in condition that the first current is not within a first current range

FIG. 1-2

20th column

30th column

METHOD, DEVICE AND SYSTEM FOR DETECTING DISPLAY PANEL

CROSS-REFERENCE TO RELATED APPLICATIONS

The present application claims priority of Chinese Patent Application No. 201710619827.4 filed on Jul. 26, 2017, the disclosure of which is incorporated herein by reference in its entirety.

TECHNICAL FIELD

Embodiments of the present disclosure relate to a method, a device, and a system for detecting a display panel.

BACKGROUND

Non-uniform display brightness of a display panel will affect a product quality of the display panel, so it is quite necessary to detect brightness uniformity of the display panel during a production process of the display panel.

In related technologies, brightness uniformity of the display panel is generally detected by using an image processing method. For example, each pixel in the display panel may be controlled to be charged to a same preset voltage, and then an image displayed by the display panel is acquired with a camera. The brightness of each pixel in the image is compared with a preset brightness, so as to determine whether or not brightness of the display panel is uniform. The preset brightness is an ideal brightness when the pixel is normally displayed after the pixel is charged to the preset voltage.

Due to a restricted resolution of the image acquired by the camera, detection accuracy of the detecting method in the related technologies is restricted.

SUMMARY

In order to solve one of problems that detection accuracy of the detecting method in the related technologies is restricted, due to a restricted resolution of an image acquired by a camera in the related technologies, embodiments of the present disclosure provide a method, a device, and a system for detecting a display panel.

In first aspect of the present disclosure, it is provided a method for detecting a display panel, the display panel comprising a plurality of groups of pixels, and the method comprises: controlling the plurality of groups of pixels to be successively displayed with a first gray scale, and in condition that an ith group of pixels are displayed with the first gray scale, controlling other groups of pixels in the plurality of groups of pixels except the ith group of pixels to be displayed with a second gray scale; the ith group of pixels being any group of pixels in the plurality of groups of pixels, the first gray scale being different from the second gray scale, and i being a positive integer; detecting a first current output by the display panel, in a process of displaying the ith group of pixels with the first gray scale; and determining that a display abnormality occurs to the ith group of pixels, in condition that the first current is not within a first current range.

As an example, the method further comprises: counting a total group number of pixel groups to which the display abnormality occurs in the display panel; and determining that the display abnormality occurs to the display panel, in condition that the total group number is greater than a preset group number.

As an example, after the detecting the first current output by the display panel, the method further comprises: determining that a display defect occurs to the display panel, in condition that the first current is not within the second current range, the first current range being within the second current range.

As an example, the determining that the display defect occurs to the display panel, in condition that the first current is not within the second current range, comprises: acquiring a display image of the display panel, in condition that the first current is not within the second current range; and determining that a display defect occurs to the display panel, in condition that a display dark line or a display bright line appears in the display image.

As an example, before the controlling each group of pixels in the plurality of groups of pixels to be successively displayed with the first gray scale, the method further comprises: controlling the plurality of groups of pixels in the display panel to be displayed with a second gray scale; and detecting a second current output by the display panel.

As an example, the method further comprises: controlling the plurality of groups of pixels in the display panel to be displayed with the first gray scale; and detecting a third current output by the display panel.

As an example, the method further comprises: determining the first current range based on the second current and the third current.

As an example, the determining the first current range based on the second current and the third current, comprises: determining a preset standard current I according to a current formula, based on a second current I2 and a third current I3, and determining the first current range according to the preset standard current; the current formula being: $I=(I3-I2)/n$; wherein n is a total group number of pixel groups in the display panel.

As an example, an upper limit of the first current range is: $I \times k1 + I2$, and a lower limit of the first current range is: $I \times k2 + I2$, wherein k1 and k2 are preset current coefficients, k1 is greater than k2, and k2 is greater than zero.

In second aspect of the present disclosure, it is provided a device for detecting a display panel, the display panel comprising a plurality of groups of pixels, and the device comprises: a control circuit, configured to control each group of pixels in the plurality of groups of pixels to be successively displayed with a first gray scale, and in condition that an ith group of pixels are displayed with the first gray scale, controlling other groups of pixels in the plurality of groups of pixels except the ith group of pixels to be displayed with a second gray scale, the ith group of pixels being any group of pixels in the plurality of groups of pixels, the first gray scale being different from the second gray scale, and i being a positive integer; a detecting circuit, configured to detect a first current output by the display panel, in a process of displaying the ith group of pixels with the first gray scale; and a first determination circuit, configured to determine that a display abnormality occurs to the ith group of pixels, in condition that the first current is not within a first current range.

As an example, the device further comprises: a counting circuit, configured to count a total group number of pixel groups to which the display abnormality occurs in the display panel; and a second determination circuit, configured to determine that the display abnormality occurs to the display panel, in condition that the total group number is greater than a preset group number.

As an example, the device further comprises: a third determination circuit, configured to determine that a display defect occurs to the display panel, in condition that the first current is not within a second current range, the first current range being within the second current range.

As an example, the third determination circuit is configured to: acquire a display image of the display panel, in condition that the first current is not within the second current range; and determine that a display defect occurs to the display panel, in condition that a display dark line or a display bright line appears in the display image.

As an example, the control circuit is further configured to control the plurality of groups of pixels in the display panel to be displayed with the second gray scale; the detecting circuit is further configured to detect a second current output by the display panel.

As an example, the control circuit is further configured to control the plurality of groups of pixels in the display panel to be displayed with the first gray scale; the detecting circuit is further configured to detect a third current output by the display panel.

As an example, the device further comprises: a fourth determination circuit, configured to determine the first current range based on the second current and the third current.

As an example, the fourth determination circuit is configured to determine a preset standard current I based on the second current I2 and the third current I3, according to a current formula, and determine the first current range according to the preset standard current, the current formula being: $I=(I3-I2)/n$; wherein n is a total group number of pixel groups in the display panel.

As an example, an upper limit of the first current range is: $I \times k1 + I2$, and a lower limit of the first current range is: $I \times k2 + I2$, wherein k1 and k2 are preset current coefficients, k1 is greater than k2, and k2 is greater than zero.

In third aspect of the present disclosure, it is provided a system for detecting a display panel, comprising: the aforementioned device for detecting the display panel.

As an example, the system further comprising: a signal generator, a current detector, a setting circuit, a data comparison circuit, an image acquisition device, a memory, a checking circuit and a compensating circuit.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 1-1 is a structural schematic diagram of a system for detecting a display panel provided by an embodiment of the present disclosure;

FIG. 1-2 is a flow chart of a method for detecting the display panel provided by an embodiment of the present disclosure;

FIG. 2 is a flow chart of another method for detecting the display panel provided by an embodiment of the present disclosure;

FIG. 4-1 is a schematic diagram of a display image of a display panel provided by an embodiment of the present disclosure;

FIG. 4-2 is a schematic diagram of a display image of another display panel provided by an embodiment of the present disclosure;

FIG. 4-3 is a schematic diagram of a display image of still another display panel provided by an embodiment of the present disclosure;

FIG. 4-4 is a schematic diagram of a display image of yet another display panel provided by an embodiment of the present disclosure;

FIG. 4-5 is a schematic diagram of a display image of a display panel provided by another embodiment of the present disclosure;

FIG. 4-6 is a schematic diagram of a display image of another display panel provided by another embodiment of the present disclosure;

FIG. 4-7 is a schematic diagram of a display image of still another display panel provided by another embodiment of the present disclosure;

FIG. 4-8 is a schematic diagram of a display image of yet another display panel provided by another embodiment of the present disclosure;

FIG. 5-1 is a schematic diagram of a per-column pixel lightening current in multi-column pixels provided by an embodiment of the present disclosure;

FIG. 5-2 is a schematic diagram of a per-column pixel lightening current in partial-column pixels provided by an embodiment of the present disclosure;

FIG. 6-1 is a structural schematic diagram of a device for detecting a display panel provided by an embodiment of the present disclosure;

FIG. 6-2 is a structural schematic diagram of another device for detecting a display panel provided by an embodiment of the present disclosure; and FIG. 6-3 is a structural schematic diagram of still another device for detecting a display panel provided by an embodiment of the present disclosure.

DETAILED DESCRIPTION

Figure 2:
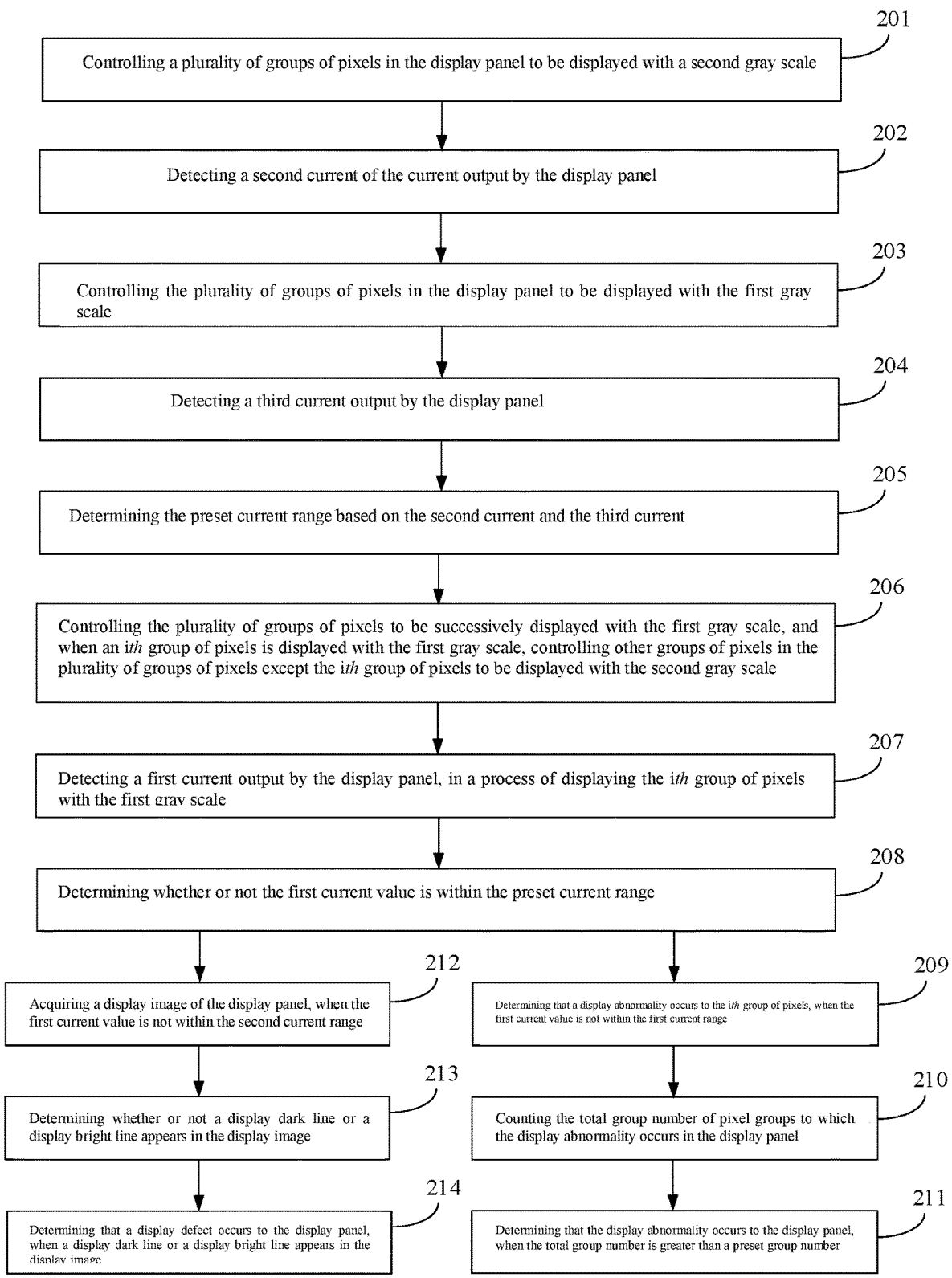

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present disclosure, are not intended to indicate any sequence, amount or importance, but distinguish various components. The terms "comprises," "comprising," "includes," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

In a fabrication process of a display panel, some display abnormalities, such as, vertical or horizontal stripped-mura, and periodic mura (i.e., mura-type NG), may occur to the display panel due to process characteristics in Excimer Laser Annealing (ELA) device or development device, as well as the circuit driving mode of the display panel. These display abnormalities are generally caused by the characteristic difference in the display driving circuit or the slight difference in drive current. Because display abnormalities correspond to a relatively small area in the display panel, the abnormalities occur periodically and have a relatively small difference from a portion where no abnormality occurs. In case that the display abnormalities are to be detect by using an image processing method, requirements on an environment for photographing an image is relatively higher, a detection algorithm is more complex, and support for an image processor and a server with more powerful function is needed. Therefore, an disadvantages of an existing detecting method is that a large amount of device resources is occupied, the detecting efficiency is low, and the detection accuracy is restricted by the resolution of the display. In case that the display abnormalities are to be detected by using an artificial method, the detecting method consumes a large amount of manpower, and it is difficult to have a unified standard, which is not favorable for a constant high quality of the display panel.

Figures 1, 4:
Figures 2, 4:
Figures 3, 4:
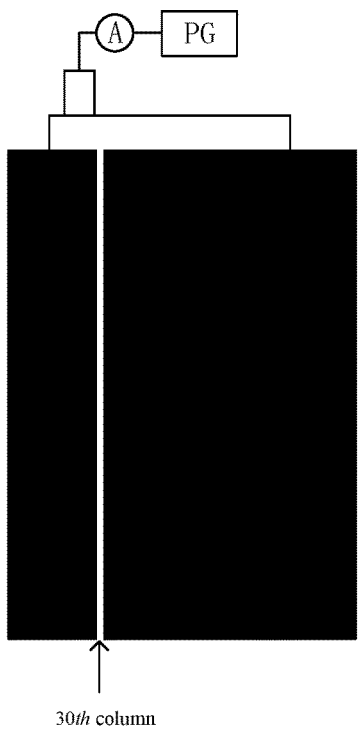
Figure 4:
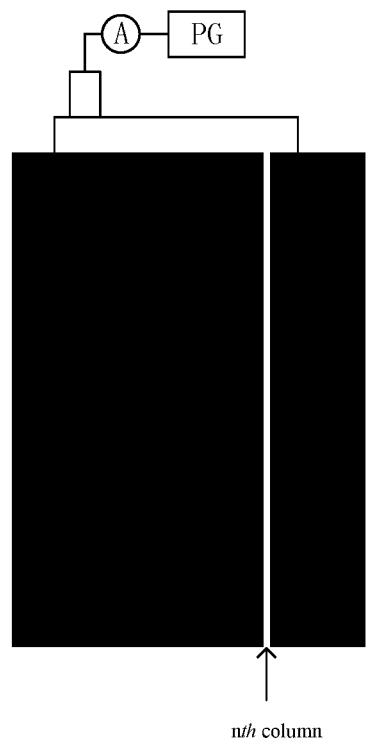

With respect to the above-described problems, an embodiment of the present disclosure provides a system for detecting a display panel, the system is configured for detecting brightness uniformity of the display panel during a production procedure of the display panel. As illustrated in FIG. 1-1, the system for detecting a display panel comprises: a signal generator a, a precision ammeter b, a setting circuit c, a data comparison circuit d, a camera e, a memory f, a checking circuit g, a compensating circuit h, and a display panel i. The signal generator a serves as a power source and a signal source for the display panel. The precision ammeter b may be replaced with other current detector, for recording current corresponding to respective patterns of the display panel, and inputting the current value into the data comparison circuit. The setting circuit c may determine a preset current range according to actual application needs or product characteristics of the display panel. The data comparison circuit d is configured for performing data processing on a detected current, and determining brightness of the display panel according to the preset current range. The compensating circuit h is configured for generating a compensation algorithm and writing the same into the display panel in case that a brightness abnormality occurs in the display panel. The camera e may be replaced with other image acquisition device, and it is configured for photographing a display panel having suspect brightness abnormality for recheck purpose, and sending a photograph to the memory f. The memory f is, for example, a picture memory, for storing photographs. The checking circuit g provides a picture for the user's recheck through the display device, or the checking circuit g determines whether or not brightness is uniform with a picture processing system, and then feeds a result to the user. The display panel i may include a plurality of groups of pixels. For example, each group of pixels in the plurality of groups of pixels may be a row of pixels or a column of pixels. For example, the display panel i may be a current-driven display panel, which is relatively sensitive to a current change. For example, the display panel may be an Organic Light-Emitting Diode (OLED) display panel such as an Active matrix organic light emitting diode (AMOLED) display panel, and the camera e may be a Charge Coupled Device (CCD) camera.

FIG. 1-2 is a flow chart of a method for detecting a display panel provided by an embodiment of the present disclosure, the method may be used in the system for detecting a display panel illustrated in FIG. 1-1. As illustrated in FIG. 1-2, the method comprises:

Step 101: controlling a plurality of groups of pixels to be successively displayed with a first gray scale, and when an ith group of pixels are displayed with the first gray scale, controlling other groups of pixels in the plurality of groups of pixels except the ith group of pixels to be displayed with a second gray scale.

Herein, the ith group of pixels is any group of pixels in the plurality of groups of pixels, i is a positive integer, and i is a positive integer less than or equal to the total number of groups of pixels in the display panel. For example, if the display panel includes N groups of pixels, then i is a positive integer less than or equal to N. The first gray scale is different from the second gray scale, and the first gray scale and the second gray scale may be determined according to actual needs or product characteristics of the display panel. For example, the first gray scale may be 128 or 255, and the second gray scale may be 0.

Step 102: detecting a first current output by the display panel, in a process of displaying the ith group of pixels with the first gray scale.

Step 103: determining that a display abnormality occurs to the ith group of pixels, in condition that the first current is not within a first current range.

In summary, in the method for detecting a display panel provided by the embodiment of the present disclosure, the plurality of groups of pixels are controlled to be successively displayed with the first gray scale; in the process of displaying the ith group of pixels with the first gray scale, the first current output by the display panel is detected; and when the first current is not in the first current range, it is determined that a display abnormality occurs to the ith group of pixels. In the method, the display abnormality in the display panel is detected, by using a characteristic that the display panel is sensitive to a current. In comparison with the related technologies, the method is not restricted by a resolution of an image, which avoids the problem that detection accuracy is restricted due to the restricted resolution of the image acquired by a camera, and increases accuracy of the method for detecting the display panel.

FIG. 2 is a flow chart of another method for detecting the display panel provided by an embodiment of the present disclosure, and as illustrated in FIG. 2, the method comprises:

Step 201: controlling a plurality of groups of pixels in the display panel to be displayed with a second gray scale.

When the display panel is being detected, the display panel may be firstly connected with a signal generator a (PG), so that the signal generator supplies power and a signal during display to the display panel, and all pixels in the display panel are controlled to be displayed with the second gray scale, so as to obtain a current output by the display panel.

Exemplarily, it is assumed that the second gray scale is 0, then the plurality of groups of pixels in the display panel may be controlled to be all displayed with the second gray scale 0, and at this time, the display panel displays a black picture.

Step 202: detecting a second current output by the display panel.

When the signal generator controls the plurality of groups of pixels in the display panel to be all displayed with the second gray scale, the current output by the display panel is the second current, and the second current may be taken as a reference current for determining the preset current range. For example, a precision ammeter b may be configured for detecting the second current output by the display panel, and storing the second current in the memory for use.

Exemplarily, it is assumed that when the plurality of groups of pixels in the display panel are controlled to be all displayed with the second gray scale 0, the second current output by the display panel detected by the precision ammeter is 100 microamperes ($\mu A$).

Step 203: controlling the plurality of groups of pixels in the display panel to be displayed with the first gray scale.

When the plurality of groups of pixels in the display panel are all displayed with the first gray scale, the current output by the display panel may be taken as the reference current for determining the preset current range. Exemplarily, it is assumed that the first gray scale is 255, then the plurality of groups of pixels in the display panel may be controlled to be all displayed with the first gray scale 255, and at this time, the display panel displays a white picture.

Step 204: detecting a third current output by the display panel.

When the signal generator controls the plurality of groups of pixels in the display panel to be all displayed with the first gray scale, the current output by the display panel is the third current, and the third current may be taken as the reference current for determining the preset current range. Exemplarily, it is assumed that when the plurality of groups of pixels in the display panel are controlled to be all displayed with the first gray scale 255, the third current output by the display panel detected by the precision ammeter b is 500 microamperes.

Step 205: determining the preset current range based on the second current and the third current.

For example, in different application scenarios, there are different requirements on brightness uniformity of the display panel, thus a setting circuit c is configured to determine the preset current range according to actual application needs or product characteristics of the display panel. In the embodiment of the present disclosure, the preset current range may include: a first current range and a second current range; the first current range is a current range determined according to a display abnormality of slight mura occurring to display, and the second current range is a current range determined according to a display defect of severe mura occurring to a display module in the display panel, the display abnormality may be presented as a display dark line or a display bright line (i.e., an X-Line) that appears during display, and thus, the first current range may be within the second current range.

Figure 3:
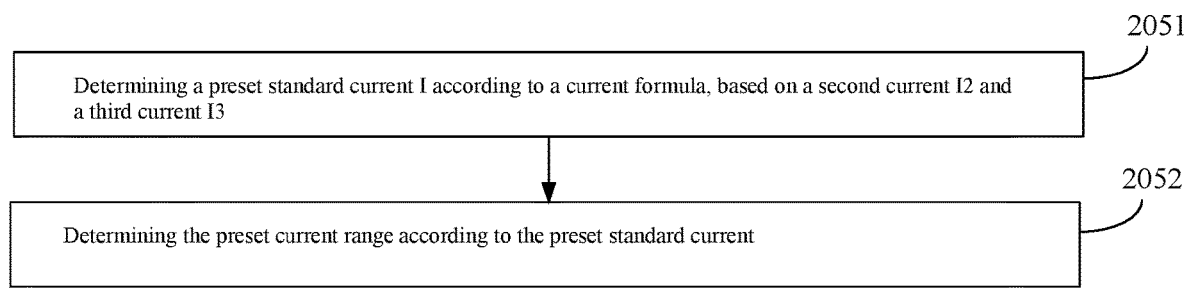
FIG. 3 is a flow chart of a method for determining a first current range provided by an embodiment of the present disclosure.

For example, as illustrated in FIG. 3, the process of determining the preset current range based on the second current and the third current includes:

Step 2051: determining a preset standard current I according to a current formula, based on the second current I2 and the third current I3.

Herein, the current formula is: $I=(I3-I2)/n$, where, n is the total group number of pixel groups in the display panel.

Exemplarily, it is assumed that the second current I2=100 $\mu A$, the third current I3=500 $\mu A$, and there are 800 columns of pixels totally in the display panel, that is, the total group number of pixel groups in the display panel is n=800, then the preset standard current $I=(I3-I2)/n=(500\ \mu A-100\ \mu A)/800=0.5\ \mu A$.

Step 2052: determining the preset current range according to the preset standard current.

For example, an upper limit of the first current range is: $I\times k1+I2$, and a lower limit of the first current range is: $I\times k2+I2$, where, k1 and k2 are preset current coefficients, k1 is greater than k2, and k2 is greater than 0. For example, k1 is 1.03, and k2 is 0.97, that is, the upper limit of the first current range is: $I\times 1.03+I2$, and the lower limit of the first current range is: $I\times 0.97+I2$.

For example, an upper limit of the second current range is: $I\times k3+I2$, and a lower limit of the second current range is: $I\times k4+I2$, where, k3 and k4 are preset current coefficients, k3 is greater than k1, k2 is greater than k4, and k4 is greater than 0. For example, k3 is 1.1, and k4 is 0.9, that is, the upper limit of the second current range is: $I\times 1.10+I2$, and the lower limit of the second current range is: $I\times 0.9+I2$.

Exemplarily, it is assumed that the second current I2=100 $\mu A$, and the preset standard current I is 0.5 $\mu A$, then the upper limit of the first current range determined by the setting circuit c is: $I\times 1.03+I2=0.515\ \mu A+100\ \mu A=100.515\ \mu A$, and the lower limit of the first current range is: $I\times 0.97+I2=0.485\ \mu A+100\ \mu A=100.485\ \mu A$, that is, the first current range is: [100.485 $\mu A$, 100.515 $\mu A$], the upper limit of the second current range is: $I\times 1.10+I2=0.55\ \mu A+100\ \mu A=100.55\ \mu A$, and the lower limit of the second current range is: $I\times 0.9+I2=0.45\ \mu A+100\ \mu A=100.45\ \mu A$, that is, the second current range is: [100.45 $\mu A$, 100.55 $\mu A$].

Step 206: controlling the plurality of groups of pixels to be successively displayed with the first gray scale, and when an ith group of pixels is displayed with the first gray scale, controlling other groups of pixels in the plurality of groups of pixels except the ith group of pixels to be displayed with the second gray scale.

The controlling the plurality of groups of pixels to be successively displayed with the first gray scale refers to that each group of pixels in the plurality of groups of pixels are controlled to be displayed in turn with the first gray scale; moreover, in case that a certain group of pixels are displayed with the first gray scale, all pixels in the certain group of pixels are displayed with the first gray scale. At a same time, other groups of pixels in the plurality of groups of pixels except the certain group of pixels are all displayed with the second gray scale.

Exemplarily, it is assumed that the first gray scale is 255 and the second gray scale is 0, then each group of pixels in the plurality of groups of pixels may be controlled to be displayed in turn with the first gray scale 255; moreover, in case that the certain group of pixels is displayed with the first gray scale 255, all pixels in the certain group of pixels are displayed with the first gray scale 255. At a same time, other groups of pixels in the plurality of groups of pixels except the certain group of pixels are all displayed with the second gray scale 0.

With reference to FIG. 4-1, FIG. 4-2, FIG. 4-3 and FIG. 4-4, FIG. 4-1 is a display image showing that the 10th column of pixels are displayed with the first gray scale 255 while other columns of pixels are displayed with the second gray scale 0; FIG. 4-2 is a display image showing that the 20th column of pixels are displayed with the first gray scale 255 while other columns of pixels are displayed with the second gray scale 0; FIG. 4-3 is a display image showing that the 30th column of pixels are displayed with the first gray scale 255 while other columns of pixels are displayed with the second gray scale 0; FIG. 4-4 is a display image showing that the nth column of pixels are displayed with the first gray scale 255 while other columns of pixels are displayed with the second gray scale 0. PG is the signal generator for loading a signal to the display panel, and A is the precision ammeter for detecting the current output by the display panel. From FIG. 4-1, FIG. 4-2, FIG. 4-3 and FIG. 4-4, it may be seen that, the image displayed by the pixel column displayed with the first gray scale 255 is white in the display panel, and the image displayed by the other pixel columns displayed with the second gray scale 0 is in black in the display panel.

Figures 4, 5:
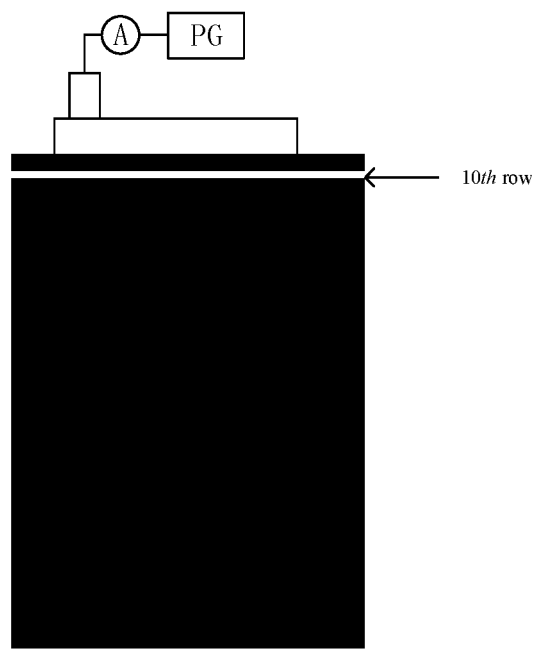
Figures 4, 5, 6:
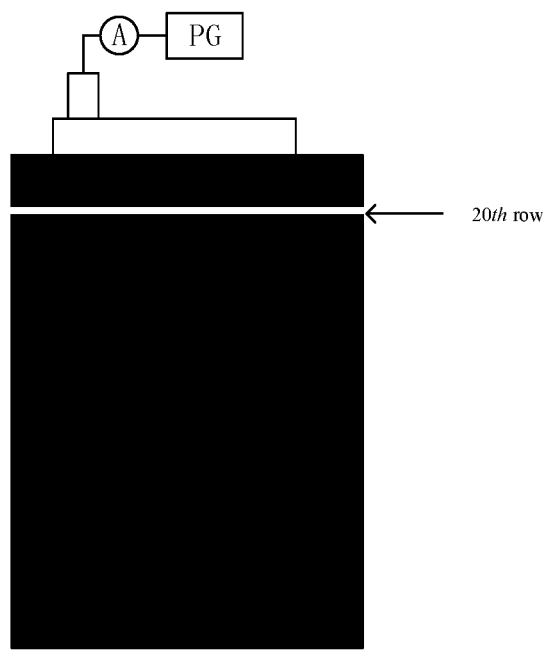
Figures 4, 5, 6, 7:
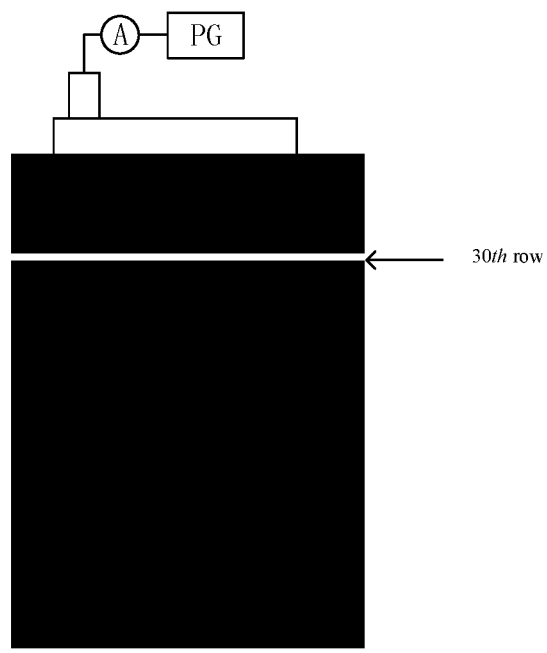
Figures 4, 5, 6, 7, 8:
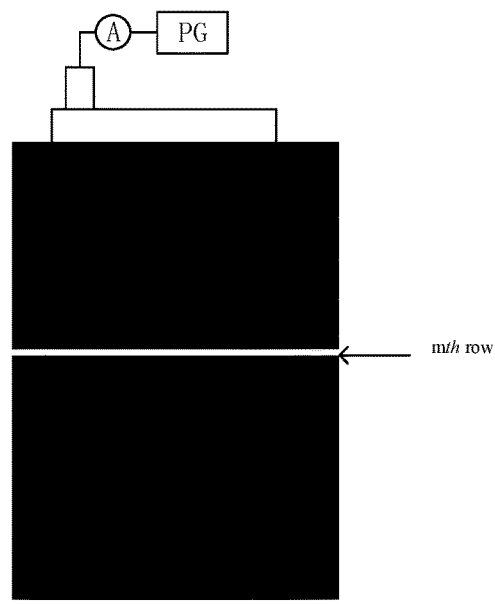
Figures 1, 5:
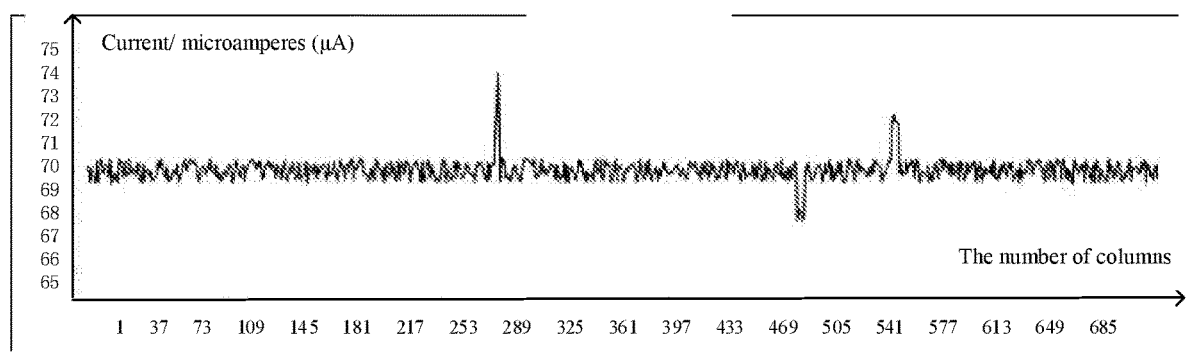
Figures 2, 5:
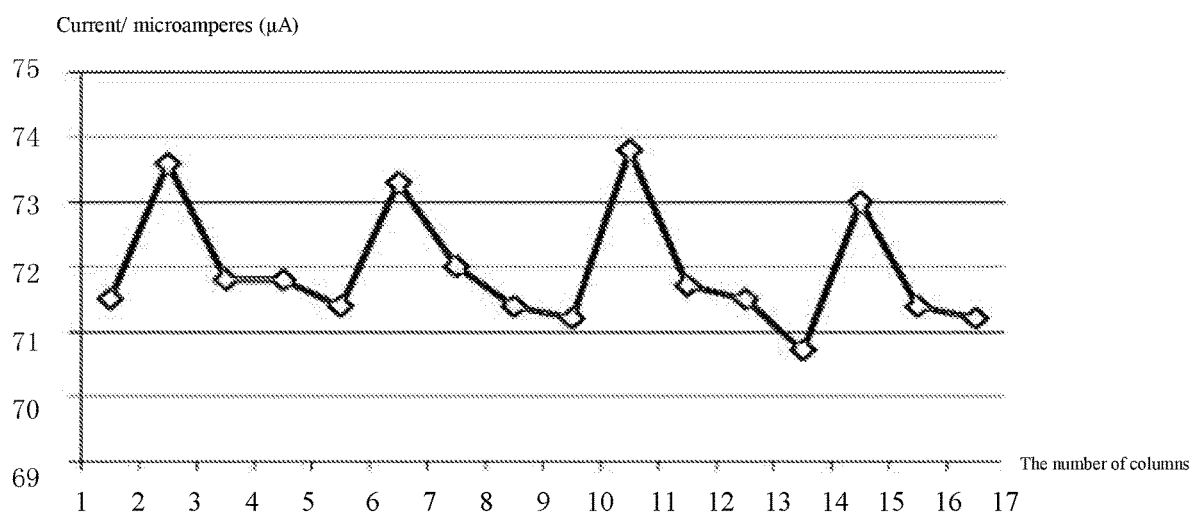
Figures 1, 6:
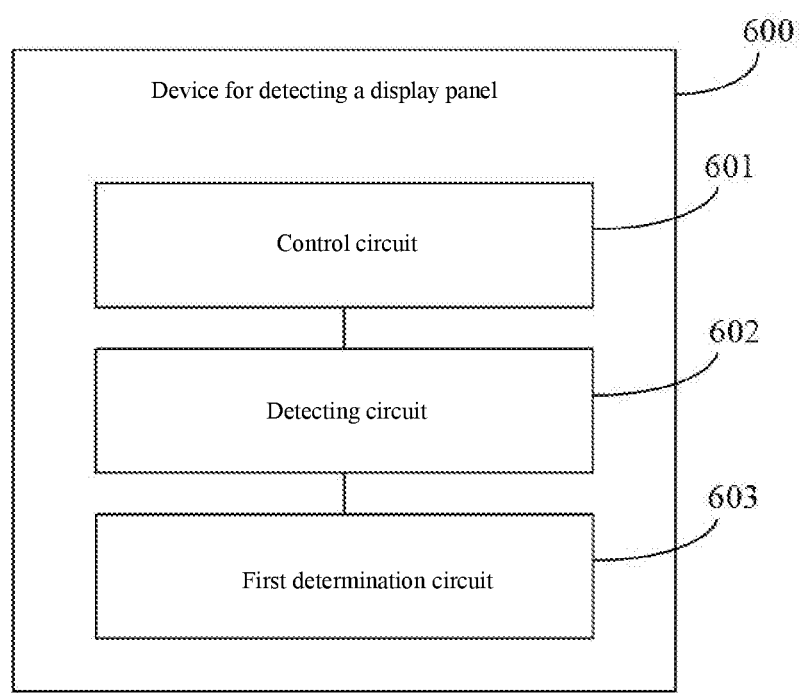
Figures 2, 6:
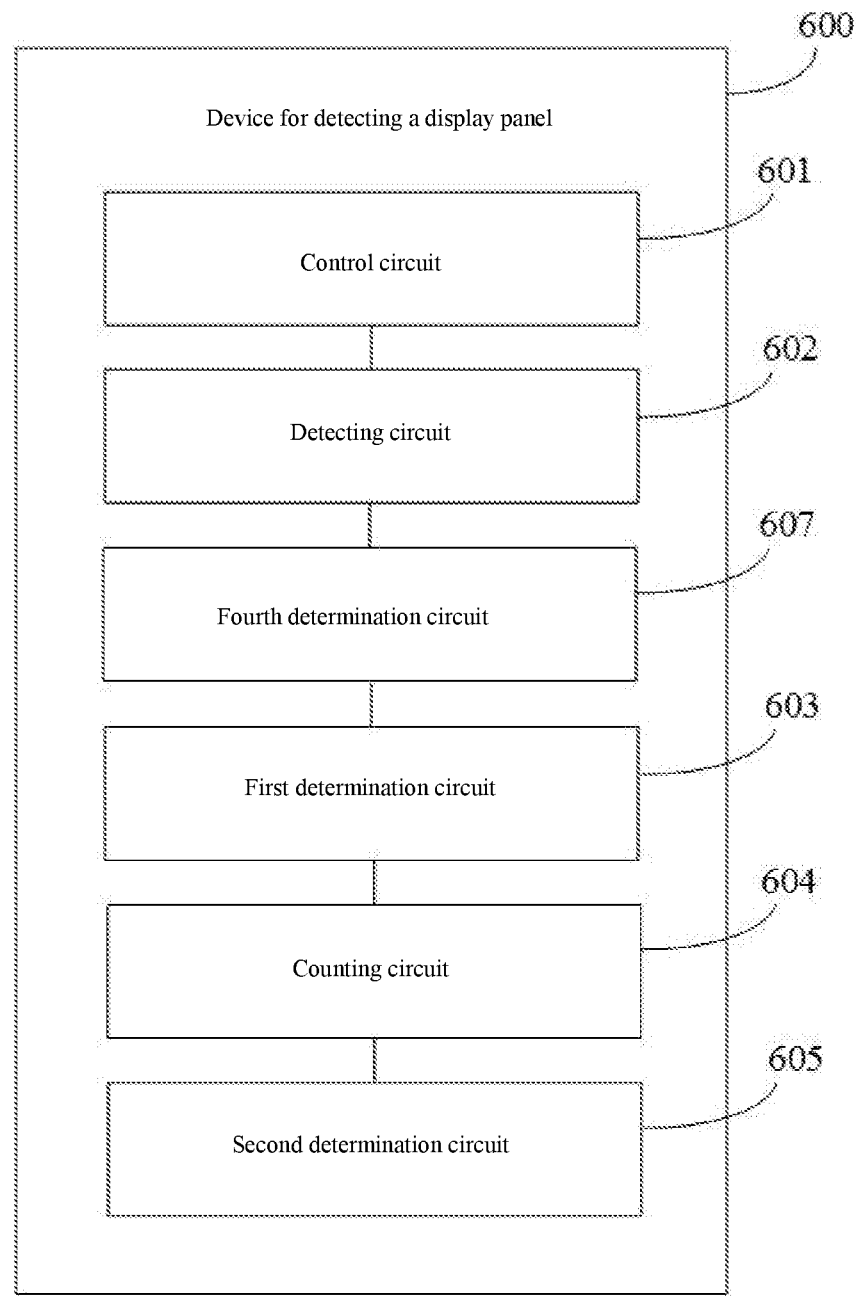
Figures 3, 6:
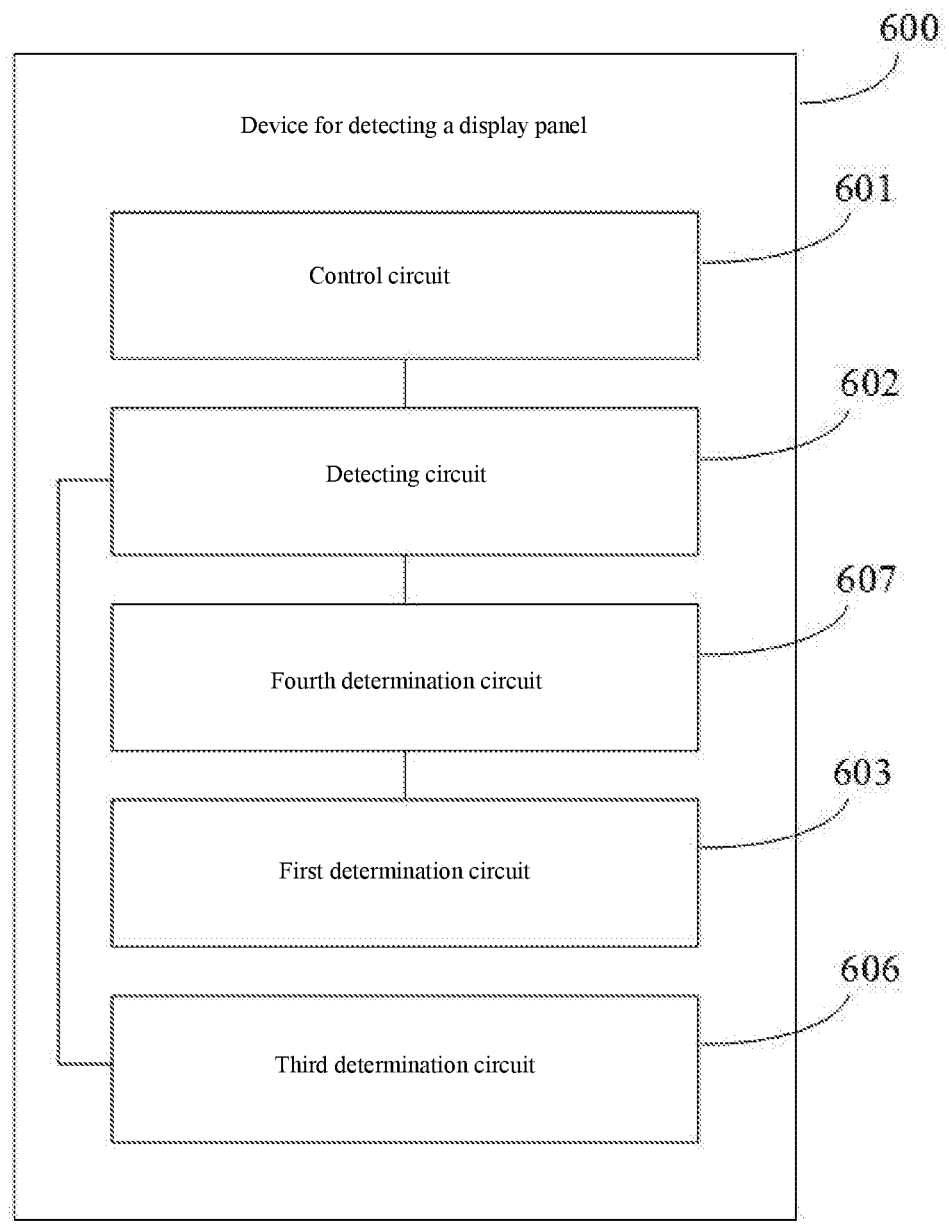

With reference to FIG. 4-5, FIG. 4-6, FIG. 4-7 and FIG. 4-8, FIG. 4-5 is a display image showing that the 10th row of pixels are displayed with the first gray scale 255 while other rows of pixels are displayed with the second gray scale 0; FIG. 4-6 is a display image showing that the 20th row of pixels are displayed with the first gray scale 255 while other rows of pixels are displayed with the second gray scale 0; FIG. 4-7 is a display image showing that the 30th row of pixels are displayed with the first gray scale 255 while other rows of pixels are displayed with the second gray scale 0; FIG. 4-8 is a display image showing that the mth row of pixels are displayed with the first gray scale 255 while other rows of pixels are displayed with the second gray scale 0.

Step 207: detecting a first current output by the display panel, in a process of displaying the ith group of pixels with the first gray scale.

In case that the display panel is a current-driven display panel, it is relatively sensitive to a current change, and thus, when the ith group of pixels are displayed with the first gray scale, the first current output by the display panel may be detected with the precision ammeter b. The first current may be used to compare with the preset current range, so as to determine whether or not a display abnormality occurs to the ith group of pixels, or whether or not a display defect occurs to the display panel.

It should be noted that, step 205 may also be executed after step 207, and at this time, another implementation of determining the preset standard current I is: determining the preset standard current I according to $I=(I3-I1)/(n-1)$, based on the first current I1 and the third current I3. Exemplarily, it is assumed that when a first column of pixels are displayed with the first gray scale, the detected first current $I1=101$ μA, the third current $I3=500$ μA, and the total group number of pixel groups in the display panel $n=800$, then the preset standard current $I=(I3-I1)/(n-1)=(500$ μA$-101$ μA$)/(800-1)=0.499$ μA.

Step 208: determining whether or not the first current is within the preset current range.

When the ith group of pixels are displayed with the first gray scale, the other groups of pixels are all displayed with the first gray scale, a brightness of only the ith group of pixels changes. If display of the group of pixels is normal, the first current should be within the preset current range based on the second current and the third current. The first current range is a current range determined when a display abnormality occurs, and the second current range is current range determined when a display defect occurs to the display module in the display panel. Therefore, in order to determine whether or not a display abnormality occurs to the ith group of pixels, the first current may be compared with the first current range by the data comparison circuit d in the system illustrated in FIG. 1-1; and in order to determine whether or not a display defect occurs to the display panel, the first current may be compared with the second current range by the data comparison circuit d in the system illustrated in FIG. 1-1.

If the first current is not within the first current range, it indicates that display of the ith group of pixels is abnormal, that is, it may be determined that a display abnormality occurs to the ith group of pixels, then step 209 is executed; if the first current is within the first current range, it indicates that display of the ith group of pixels is normal, that is, no display abnormality occurs to the ith group of pixels, then detection of a next group of pixels is continued.

If the first current is within the second current range, it indicates that no display defect occurs to the display panel; if the first current is not within the second current range, a display defect may occur to the display panel, and at this time, in order to further determine whether or not the display defect occurs to the display panel, it is a way to check the image displayed by the display panel, that is, step 212 is executed.

The first current range is within the second current range. In actual application, when the first current is not within the first current range, the first current may be within the second current range. For example, when it is determined that the first current is not within the first current range, it should be further determine that whether or not the first current is within the second current range, so as to determine whether or not a display defect occurs to the display panel.

Step 209: determining that a display abnormality occurs to the ith group of pixels, in condition that the first current is not within the first current range.

If the first current is not within the first current range, it indicates that the first current has exceeded the first current range based on the second current and the third current, that is, a display abnormality occurs to the ith group of pixels.

Exemplarily, it is assumed that the first current range is: [100.485 μA, 100.515 μA], during a process of displaying the ith group of pixels with the first gray scale, the first current output by the detected display panel is 101 μA, the first current is not within the first current range [100.485 μA, 100.515 μA], so it may be determined that a display abnormality occurs to the ith group of pixels.

Step 210: counting the total group number of pixel groups to which the display abnormality occurs in the display panel.

The first current range is a current range corresponding to a display abnormality of slight mura, so a display abnormality occurring to an individual pixel group may have little influence on the display panel, that is, influence of the display abnormality occurring to the pixel group on a display effect of the display panel is negligible; however, if a display abnormality occurs to too many pixel groups in the display panel, it will have greater influence on the display effect of the display panel, that is, a display abnormality occurs to the display panel, and thus, it is necessary to count the total group number of all pixel groups to which the display abnormality occurs in the display panel, and whether or not the display abnormality occurs to the display panel is determined according to the total group number.

Step 211: determining that the display abnormality occurs to the display panel, in condition that the total group number is greater than a preset group number.

Herein, the preset group number is a group number threshold determined according to actual needs or product characteristics of the display panel, for example, the preset group number may be 5.

If the total group number is greater than the preset group number, it indicates that influence of the display abnormality occurring to a plurality of groups of pixels on the display effect of the display panel cannot be negligible, influence on the display effect of the display panel is relatively great, and at this time, the display abnormality definitely occurs to the display panel. If the total group number is not greater than the preset group number, it indicates that influence of the display abnormality occurring to a plurality of groups of pixels on the display effect of the display panel is still negligible, and it may be determined that no display abnormality occurring to the display panel, then detection of a next display panel is continued.

Exemplarily, if the preset group number is 5, and the total group number of pixel groups to which the display abnormality occurs in the display panel is 10, then it may be determined that the display abnormality occurs to the display panel.

Step 212: acquiring a display image of the display panel, in condition that the first current is not within the second current range.

If the first current is not within the second current range, a display defect may occur to the display panel; however, in order to further determine whether or not the display defect occurs to the display panel, it is necessary to check the display image of the display panel. For example, in a process of displaying the ith group of pixels with the first gray scale, the display image of the display panel is acquired by using a camera e, the acquired display image is stored in a memory f. For example, FIG. 4-1, FIG. 4-2, FIG. 4-3 and FIG. 4-4 shows the acquired display image.

In actual application, the process of comparing the first current with the preset current range may also be: comparing a difference between the first current and the second current (the difference may be referred to as a single-group pixel lightening current) with a corresponding preset current range; and the corresponding preset current range may include: a corresponding first current range and a corresponding second current range, the corresponding first current range is [I×0.97, I×1.03], and the corresponding second current range is [I×0.9, I×1.1].

If the single-group pixel lightening current is not within the corresponding first current range, it is determined that a display abnormality occurs to the ith group of pixels; and if the single-group pixel lightening current is within the corresponding first current range, it is determined that no display abnormality occurs to the ith group of pixels.

If the single-group pixel lightening current is not within the corresponding second current range, it is determined that a display defect occurs to the display panel, and if the single-group pixel lightening current is within the corresponding second current range, it is determined that no display defect occurs to the display panel.

Exemplarily, with reference to FIG. 5-1, FIG. 5-1 is a schematic diagram of a per-column pixel lightening current among multi-column pixels, the horizontal axis represents the number of columns of pixels, and the vertical axis represents the current with a unit μA; it may be seen from FIG. 5-1 that currents of the 270th column of pixels, 478th column of pixels and 548th column of pixels fluctuate relatively greatly, and it may be determined that they have a display abnormality. With reference to FIG. 5-2, FIG. 5-2 is a schematic diagram of a per-column pixel lightening current among partial-column pixels in the display panel, the horizontal axis represents the number of columns of pixels, and the vertical axis represents the current with a unit μA; it may be seen from FIG. 5-2 that an abnormality periodically occurs to the per-column pixel lightening current in the pixel column in FIG. 5-2, so it may be determined that periodic mura occurs to the display panel.

Step 213: determining whether or not a display dark line or a display bright line appears in the display image.

Checking the display image of the display panel is accomplished by detecting whether or not a display dark line or a display bright line appears in the display image with a checking circuit g, and a checking mode thereof may be: observing the display image by human eyes, and determining whether or not a display dark line or a display bright line appears in the display image, alternatively, the checking may also be performed by using an image processing method, to detect whether or not a significant abnormality occurs to a pixel value of a pixel point in the display image.

For example, the checking is performed in the mode of observing the display image by human eyes. If the human eyes see a display dark line or a display bright line in the display image, it may be determined that the display dark line or the display bright line appears in the display image, and at this time, step 214 is executed. For example, the checking is performed by using the image processing method, the checking may be performed with an image processing system (for example, Cell Test), and the method is: acquiring the brightness of the pixel point in the display image, and comparing the brightness of the pixel point with a brightness threshold corresponding to the display dark line or a brightness threshold corresponding to the display bright line; if the brightness of a certain row of pixel points or the brightness of a certain column of pixel points are all less than the brightness threshold corresponding to the display dark line, it is determined that the display dark line appears in the display image, and at this time, step 214 is executed; and if the brightness of a certain row of pixel points or the brightness of a certain column of pixel points are all greater than the brightness threshold corresponding to the display bright line, it is determined that a display bright line appears in the display image, and step 214 is executed.

Exemplarily, it is assumed that the brightness of a certain column of pixel points in the display image are all 255, the brightness threshold corresponding to the display bright line is 128, and the brightness of the column of pixel points are all greater than the brightness threshold corresponding to the display bright line, then it may be determined that a display bright line appears in the display image, and then step 214 is executed.

Step 214: determining that a display defect occurs to the display panel, in condition that a display dark line or a display bright line appears in the display image.

If the first current is not within the second current range, and it is determined that a display dark line or a display bright line appears in the image displayed by the display panel through checking, it may be determined that a display defect occurs to the display panel, and at this time, the display module in the display panel may be rebuilt, or the display panel is scrapped.

In the above-described embodiments, the specific implementation process of the method for detecting the display panel is described by taking the group of pixels being a column of pixels as an example. However, in case that the group of pixels are a row of pixels, the specific implementation process recited in the above-described process may be also suitable for the method for detecting the display panel which includes rows of pixels. In addition, in actual application, when the display panel is detected, the plurality of groups of pixels of the entire display panel may be detected column by column, that is, a single column of pixels is considered as a group of pixels; alternatively, the plurality of groups of pixels of the entire display panel may be detected row by row, that is, a single row of pixels is considered as a group of pixels. Alternatively, in order to further increase detection accuracy, the plurality of groups of pixels of the entire display panel may be firstly detected column by column, and then detected row by row; or, the plurality of groups of pixels of the entire display panel may be firstly detected row by row, and then detected column by column.

It should be noted that, in case that the first current is not within the first current range and the first current is within the second current range, or, in case that the first current is not within the second current range and it is determined through checking that no display dark line or display bright line appears in the image displayed by the display panel, then a compensating circuit h may generate a compensation algorithm for a corresponding pixel group, according to a specific situation in which a display abnormality occurs to the pixel group, and write the compensation algorithm into the display panel, to compensate for the display abnormality occurring, so as to eliminate or reduce influence of the display abnormality on display. In addition, the compensated display panel may also be detected by using the above-described detecting method, to determine that the compensated display panel no longer has any display abnormality or display defect.

In summary, in the method for detecting the display panel provided by the embodiment of the present disclosure, the plurality of groups of pixels are controlled to be successively displayed with the first gray scale; in the process of displaying the ith group of pixels with the first gray scale, the first current output by the display panel is detected; and in condition that the first current is not within the first current range, it is determined that a display abnormality occurs to the ith group of pixels; in the method, the display abnormality in the display panel is detected, by using a characteristic that the display panel is sensitive to a current; in comparison with the related technologies, the method is not restricted by a resolution of an image, which avoids the problem that detection accuracy is restricted due to the restricted resolution of the image acquired by a camera, and increases accuracy of the method for detecting the display panel. Moreover, the detecting method is easy to implement and occupies less device resource, which reduces detection costs of the display panel, and at a same time, in the method, a display defect of the display module in the display panel may be detected, and the detecting method may be used in a final stage before shipment of the display panel, which expands a usage scope of the detecting method.

It should be noted that, the order of the steps of the method for detecting the display panel provided by the embodiment of the present disclosure may be changed, and the steps may also be correspondingly increased or reduced according to situations. Any skilled in the art, within the technical scope disclosed by the present disclosure, can easily concede various methods, which should be within the protection scope of the embodiment of the present disclosure.

An embodiment of the present disclosure further provides a device for detecting a display panel, the display panel including a plurality of groups of pixels, each group of pixels is a row of pixels or a column of pixels; and as illustrated in FIG. 6-1, the device 600 comprises:

A control circuit 601, configured to control each group of pixels in the plurality of groups of pixels to be successively displayed with a first gray scale, and when an ith group of pixels is displayed with the first gray scale, other groups of pixels in the plurality of groups of pixels except the ith group of pixels are controlled to be displayed with a second gray scale, herein, the ith group of pixels is any group of pixels in the plurality of groups of pixels, i is a positive integer. Exemplarily, the control circuit may be a signal generator a illustrated in FIG. 1-1.

A detecting circuit 602, configured to detect a first current output by the display panel, in a process of displaying the ith group of pixels with the first gray scale. Exemplarily, the detecting circuit may be a precision ammeter b illustrated in FIG. 1-1.

A first determination circuit 603, configured to determine that a display abnormality occurs to the ith group of pixels, when the first current is not within a first current range.

For example, as illustrated in FIG. 6-2, the device 600 further comprises:

A counting circuit 604, configured to count the total group number of pixel groups to which the display abnormality occurs in the display panel.

A second determination circuit 605, configured to determine that the display abnormality occurs to the display panel, in condition that the total group number is greater than a preset group number.

For example, as illustrated in FIG. 6-3, the device 600 further comprises:

A third determination circuit 606, configured to determine that a display defect occurs to the display panel, in condition that the first current is not within the second current range, the first current range being within the second current range. Exemplarily, a data comparison circuit d illustrated in FIG. 1-1 may be configured for executing actions of the first determination circuit, the counting circuit and the second determination circuit; in addition, the data comparison circuit d may also execute the action of determining that a display defect occurs to the display panel performed by the third determination circuit.

For example, the third determination circuit 606 may be configured to:

acquire a display image of the display panel, in condition that the first current is not within the second current range, and store the acquired image in a preset position of the memory for use. Exemplarily, a camera e illustrated in FIG. 1-1 may execute the action of acquiring the display image of the display panel;

detect whether or not a display dark line or a display bright line appears in the display image, and determine that a display defect occurs to the display panel, in condition that a display dark line or a display bright line appears in the display image. Exemplarily, a checking circuit g illustrated in FIG. 1-1 may execute the action.

For example, the control circuit 601 is further configured to control the plurality of groups of pixels in the display panel to be displayed with the second gray scale.

The detecting circuit 602 is further configured to detect a second current output by the display panel.

The control circuit 601 is further configured to control the plurality of groups of pixels in the display panel to be displayed with the first gray scale.

The detecting circuit 602 is further configured to detect a third current output by the display panel.

For example, as illustrated in FIG. 6-2 or FIG. 6-3, the device 600 may further comprise: a fourth determination circuit 607, configured to determine the first current range based on the second current and the third current. Exemplarily, the fourth determination circuit may be a setting circuit c illustrated in FIG. 1-1.

For example, the fourth determination circuit 607 may be configured to:

determine a preset standard current I based on a second current I2 and a third current I3, according to a current formula, the current formula being:

$$I=(I3-I2)/n.$$

Herein, n is the total group number of pixel groups in the display panel.

determine the first current range according to the preset standard current.

For example, the first current range may be: 0.97 times the preset standard current to 1.03 times the preset standard current.

It should be noted that, the device may further comprise: a compensating circuit, configured to: generate a compensation algorithm for a corresponding pixel group according to a specific situation in which a display abnormality occurs to the pixel group, when the first current is not within the first current range and the first current is within the second current range, or, when the first current is not within the second current range, and it is determined through checking that no display dark line or display bright line appears in the image displayed by the display panel; and write the compensation algorithm into the display panel, to compensate for the display abnormality occurring, so as to eliminate or reduce influence of the display abnormality on display.

In summary, in the device for detecting a display panel provided by the embodiment of the present disclosure, the control circuit controls the plurality of groups of pixels to be displayed with the first gray scale successively; in the process of displaying the ith group of pixels with the first gray scale, the detecting circuit detects the first current output by the display panel; and when the first current is not within the first current range, the first determination circuit determines that a display abnormality occurs to the ith group of pixels; in the method, the display abnormality in the display panel is detected, by using a characteristic that the display panel is sensitive to a current; in comparison with the related technologies, the method is not restricted by a resolution of an image, which avoids the problem that detection accuracy is restricted due to the restricted resolution of the image acquired by a camera, and increases accuracy of the method for detecting the display panel.

Those skilled in the art may clearly understand that, for convenience and brevity of description, the corresponding processes in the foregoing method embodiments may be referred to for specific working processes of the device and the circuit as described above, which will not be repeated here.

An embodiment of the present disclosure further provides a system for detecting a display panel, and the system comprises: a device for detecting a display panel illustrated in any one of FIG. 6-1 to FIG. 6-3, and the system for detecting the display panel illustrated in FIG. 1-1 may be referred to for the structural schematic diagram of the system.

Those skilled in the art shall understand that the embodiments of the disclosure are able to be provided as a method, a system or a computer program product. Therefore, the disclosure can adopt forms of a complete hardware embodiment, a complete software embodiment or embodiment combining software and hardware. In addition, the disclosure can adopt the form of computer program product that is implemented on one or more computer applicable storage mediums (comprising, but not limited, disk memory, CD-ROM, optical memory, etc.) comprising computer applicable program codes therein.

The disclosure is described herein with reference to flowchart charts and/or block diagrams of methods, apparatuses (systems), and computer program products according to the embodiments of the disclosure. It should be understood that each flow and/or block in the flowchart and/or block diagram, and a combination of flow and/or block in the flowchart and/or block diagram can be implemented by computer program instructions. These computer program instructions may be provided to a general purpose computer, a special purpose computer, an embedded processor or a processor of other programmable data processing apparatus to form a machine, such that devices for implementing functions specified by one or more flows in the flowchart and/or one or more blocks in the block diagram may be generated by executing the instructions with the processor of the computer or other programmable data processing apparatus.

These computer program instructions may also be stored in a computer-readable memory that can direct the computer or other programmable data processing apparatus to operate in a given manner, so that the instructions stored in the computer-readable memory produce a manufactured article comprising an instruction device, and the instruction device implements the functions specified by one or more flows in the flowchart and/or one or more blocks in the block diagram.

These computer program instructions may also be loaded onto the computer or other programmable data processing apparatus, such that a series of process steps may be executed on the computer or other programmable data processing apparatus to produce process implemented by the computer, thereby, the instructions executed on the computer or other programmable data processing apparatus provide steps of implementing the functions specified by one or more flows in the flowchart and/or one or more blocks in the block diagram.

With respect to the present disclosure, several points below need to be explained:

(1) The drawings of the embodiments of the present disclosure relate only to the structures involved in the embodiments of the present disclosure, and normal designs may be referred to for other structures.

(2) For the sake of clarity, in the drawings configured for describing the embodiments of the present disclosure, thicknesses of layers or regions are enlarged or reduced, that is, these drawings are not drawn in an actual scale. It may be understood that, when an element such as a layer, a film, a region or a substrate is referred to as being located "on" or "below" another element, the element may be "immediately" located "on" or "below" another element, or there may be an intermediate element.

(3) In case of no conflict, the embodiments of the present disclosure and the features in the embodiments may be combined with each other to obtain a new embodiment.

What is described above is related to the illustrative embodiments of the disclosure only and not limitative to the scope of the disclosure; the scopes of the disclosure are defined by the accompanying claims.

The invention claimed is:

1. A method for detecting a display panel, the display panel comprising a plurality of groups of pixels, and the method comprises:

controlling the plurality of groups of pixels to be successively displayed with a first gray scale, and in condition that an ith group of pixels are displayed with the first gray scale, controlling other groups of pixels in the plurality of groups of pixels except the ith group of pixels to be displayed with a second gray scale; the ith group of pixels being any group of pixels in the plurality of groups of pixels, the first gray scale being different from the second gray scale, and i being a positive integer;

detecting a first current output by the display panel, in a process of displaying the ith group of pixels with the first gray scale; and determining that a display abnormality occurs to the ith group of pixels, in condition that the first current is not within a first current range, wherein before the controlling the plurality of groups of pixels to be successively displayed with the first gray scale, the method further comprises:

controlling the plurality of groups of pixels in the display panel to be displayed with the second gray scale; and detecting a second current I2 output by the display panel, wherein the method further comprises: controlling the plurality of groups of pixels in the display panel to be displayed with the first gray scale; and detecting a third current I3 output by the display panel, wherein the method further comprises: determining the first current range based on the second current and the third current, wherein the determining the first current range based on the second current and the third current, comprises:

determining a preset standard current I according to a current formula based on the second current I2 and the third current I3, and determining the first current range according to the preset standard current; the current formula being:

$I=(I3-I2)/n$; and wherein, n is a total group number of pixel groups in the display panel, an upper limit of the first current range is: $I \times k1+I2$, and a lower limit of the first current range is: $I \times k2+I2$, wherein k1 and k2 are preset current coefficients, k1 is greater than k2, and k2 is greater than zero.

2. The method according to claim 1, wherein the method further comprises:
counting the total group number of pixel groups to which the display abnormality occurs in the display panel; and
determining that the display abnormality occurs to the display panel, in condition that the total group number is greater than a preset group number.

3. The method according to claim 1, wherein after the detecting the first current output by the display panel, the method further comprises:
determining that a display defect occurs to the display panel, in condition that the first current is not within the second current range, the first current range being within the second current range.

4. The method according to claim 3, wherein the determining that the display defect occurs to the display panel, in condition that the first current is not within the second current range, comprises:
acquiring a display image of the display panel, in condition that the first current is not within the second current range; and
determining that a display defect occurs to the display panel, in condition that a display dark line or a display bright line appears in the display image.

5. A device for detecting a display panel, the display panel comprising a plurality of groups of pixels, and the device comprises:
a control circuit, configured to control the plurality of groups of pixels to be successively displayed with a first gray scale, and in condition that an ith group of pixels are displayed with the first gray scale, controlling other groups of pixels in the plurality of groups of pixels except the ith group of pixels to be displayed with a second gray scale, the ith group of pixels being any group of pixels in the plurality of groups of pixels, the first gray scale being different from the second gray scale, and i being a positive integer;
a detecting circuit, configured to detect a first current output by the display panel, in a process of displaying the ith group of pixels with the first gray scale; and
a first determination circuit, configured to determine that a display abnormality occurs to the ith group of pixels, in condition that the first current is not within a first current range,
wherein the control circuit is further configured to control the plurality of groups of pixels in the display panel to be displayed with the second gray scale; and the detecting circuit is further configured to detect a second current I2 output by the display panel;
wherein the control circuit is further configured to control the plurality of groups of pixels in the display panel to be displayed with the first gray scale; and the detecting circuit is further configured to detect a third current I3 output by the display panel,
wherein the device further comprises: a fourth determination circuit, configured to determine the first current range based on the second current I2 and the third current I3,
wherein the fourth determination circuit is configured to determine a preset standard current I based on the second current I2 and the third current I3, according to a current formula, and determine the first current range according to the reset standard current, the current formula being:

$I=(I3-I2)/n$;

wherein, n is a total group number of pixel groups in the display panel;
wherein an upper limit of the first current range is: $I \times k1+I2$ and a lower limit of the first current range is: $I \times k2+I2$, wherein k1 and k2 are preset current coefficients, k1 is greater than k2, and k2 is greater than zero.

6. The device according to claim 5, wherein the device further comprises:
a counting circuit, configured to count a total group number of pixel groups to which the display abnormality occurs in the display panel; and
a second determination circuit, configured to determine that the display abnormality occurs to the display panel, in condition that the total group number is greater than a preset group number.

7. The device according to claim 5, wherein the device further comprises:
a third determination circuit, configured to determine that a display defect occurs to the display panel, in condition that the first current is not within a second current range, the first current range being within the second current range.

8. The device according to claim 7, wherein the third determination circuit is configured to:
   acquire a display image of the display panel, in condition that the first current is not within the second current range; and
   determine that a display defect occurs to the display panel, in condition that a display dark line or a display bright line appears in the display image.

9. A system for detecting a display panel, comprising: the device for detecting the display panel according to claim 5.

10. The system according to claim 9, further comprising: a signal generator, a current detector, a setting circuit, a data comparison circuit, an image acquisition device, a memory, a checking circuit and a compensating circuit.

* * * * *